United States Patent Office 2,841,613
Patented July 1, 1958

2,841,613

ALKOXY DIAMINOSTILBENEDISULFONIC ACIDS

Robert S. Long, Bound Brook, and Alice K. Kantor, Plainfield, N. J., assignors to American Cyanamid Company, New York, N. Y., a corporation of Maine No Drawing. Original application October 17, 1955, Serial No. 541,074. Divided and this application November 29, 1956, Serial No. 624,989

4 Claims. (Cl. 260—509)

This invention relates to intermediates for new optical bleaching agents and more specifically, to compounds which in their free acid form have the formula:

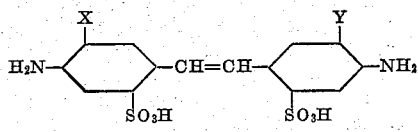

in which X is an alkoxy group and Y is a halogen. The new compounds of this invention are useful as intermediates for brighteners for cotton.

The use of optical bleaching agents to compensate for the natural yellowing of fibers has become common in the art. These compounds absorb ultra violet light and re-emit light in the blue range, thus automatically compensating for the yellow of the fiber. Since more visible light is reflected than is incident upon the fiber, the cloth actually appears to be whiter than ordinary white bleached cloth. Such compounds must have affinity for the fiber and their fluorescence must be in the blue range. The additive effect of yellow reflected light and blue fluorescence which results in an overall increase in total reflected light sharply differentiates this type of bleaching from the subtractive effect obtained when one uses the older type of bluing, which dyed the cloth a blue to compensate for the yellow.

It is essential in these compounds that the fluorescence be as much as possible a true blue. However, many brighteners are quite usable which fluoresce either reddish or greenish shades of blue. Many brighteners have been described in the prior art as being derived from diaminostilbene disulfonic acid. Most of these fluoresce a reddish shade of blue. Brighteners derived from chlorinated diaminostilbene disulfonic acids have been described. Even these have a distinctly reddish shade of blue fluorescence. The compounds which are prepared from our invention, posses a greenish shade of blue fluorescence, which had been obtainable heretofore only with other, more expensive, intermediates. It is most surprising that the replacement of one chlorine in a dichlorodiaminostilbene disulfonic acid with an alkoxy group will give an intermediate from which greenish shade brighteners can be obtained. One would not expect this change to have such a marked effect on the shade of fluorescence as to shift it from reddish blue to a greenish blue.

The brighteners prepared from the compounds of our invention are useful in brightening cotton. They can be used by themselves or they can be used in blends with redder shade brighteners to produce a neutral blue fluorescent effect on the cloth.

The compounds of our invention are prepared by forming the dichlorodinitrostilbene disulfonic acids by known methods and treating the same with a sodium alkoxide. We have found that in such a preparation a most surprising phenomenon is observed. Even with a large excess of sodium alkoxide, only one of the chlorine atoms is replaceable by alkoxy under the conditions used, and thus, the unsymmetrical compounds of our invention are prepared in this manner.

The acylation of the intermediate diaminostilbene derivatives is carried out by known methods using a variety of acylating agents. Among the acylating agents which may be used there can be cited benzoyl chloride and its derivatives such as 2,4-dimethoxybenzoyl chloride, 2,4-diethoxybenzoyl chloride, o-methoxybenzoyl chloride, o-ethoxybenzoyl chloride, 2,5-dimethoxybenzoyl chloride, 2,5-diethoxybenzoyl chloride, p-methyl-o-methoxybenzoyl chloride, p-methoxybenzoyl chloride, p-benzoylaminobenzoyl chloride, and the like; other aromatic acid chlorides such as the naphthoyl chloride, diphenyl-4-carboxy chloride, and the like; triazine chlorides such as cyanuric chloride, and heterocyclic acid chlorides such as nicotinoyl chloride, picolinoyl chloride, thenoyl chloride and similar acid chlorides. Since the triazine residues are used in the brightener art to replace acyl groups in brightener structures, the terms acyl must be interpreted to include this type of radical. When a chloro triazine such as cyanuric chloride is used, it can be condensed with either one or two mols of the alkoxy substituted diaminostilbene disulfonic acids or the diaminostilbene derivative can be condensed with two cyanuric chlorides. In such cases, the other chlorines in the triazine nucleus can be replaced with a variety of groups such as hydroxyl, alkoxy, phenoxy, anilino, morpholino, bis-$\beta$-hydroxy ethylamino, mono-$\beta$-hydroxy ethylamino, and the like, in any combination desired. Any amino groups on stilbene moieties which have not been acylated can be further acylated with benzoyl chloride derivatives, or other agents such as those mentioned above. In order to obtain the best brightening effect, all the free amino groups should be acylated in one way or another.

The brighteners prepared from the compounds of our invention are sulfonic acids or their salts. In order to get application to the cloth, the salts must be soluble in water. It is therefore preferable to use the alkali metal or ammonium salts, although in some cases the brighteners derived from the compounds of our invention may be dyed on cotton using a bath containing soap solutions, or they amy be applied by any of the usual laundry techniques. They are primarily brighteners for cotton but have substantivity on viscose rayon. Under the proper conditions, that is, slightly acid baths, the compounds of our invention will also show substantivity to nylon and to animal fibers, such as wool and silk.

It is an advantage of the brighteners derived from the intermediates of our invention, that they have very similar substantivity on cotton to that of the other diaminostilbene type brighteners. They are therefore very compatible with such brighteners in the formation of blends of a neutral blue fluorescence.

This application is a division of our copending application, Serial No. 541,074, filed October 17, 1955.

Our invention can be illustrated by the following examples in which the parts are by weight unless otherwise specified.

Example 1

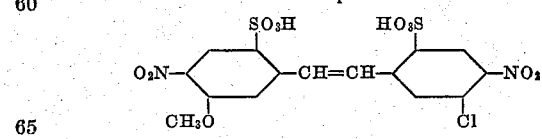

A mixture of 4 parts of disodium 5,5'-dichloro-4,4'-dinitrostilbene-2,2'-disulfonate, 119 parts of methanol and 2.65 parts of sodium methylate is refluxed for 20 hours. A small amount of alcohol-insoluble material is separated by filtration from the hot solution. The alcohol solution is then evaporated and cooled. The product, which is the disodium salt of 5-methoxy-5'-chloro-4,4'-dinitrostilbene-2,2'-disulfonic acid, is isolated by filtration and dried.

Example 2

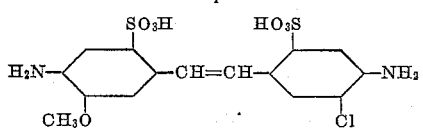

A mixture of 10 parts of Master Builders Iron Grade D, 100 parts of water and 0.5 part by volume of glacial acetic acid is heated to reflux. A solution of 2.5 parts of 5-methoxy-5'-chloro-4,4'-dinitrostilbene-2,2'-disulfonic acid disodium salt in 35 parts of water is added to the mixture. The refluxing is continued until reduction is complete. The reaction mixture is then made alkaline by the addition of 2 parts of solid sodium carbonate. The iron sludge is separated by filtration and the filtrate acidified with concentrated hydrochloric acid to give a strongly positive test on Congo Red indicator paper. The solution is reduced by boiling to one half of its volume and then cooled in an ice bath. The product, 5-methoxy - 5' - chloro - 4,4' - diaminostilbene - 2,2' - disulfonic acid, is isolated by filtration and dried.

Example 3

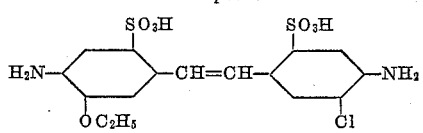

The procedure of Example 1 is followed using equivalent amounts of absolute ethanol and sodium ethoxide in place of the methanol and sodium methoxide. The solution of the starting material in absolute ethanol is boiled before adding the ethoxide to make certain all residual water in the starting material is evaporated. The product is then reduced by the procedure of Example 2.

Example 4

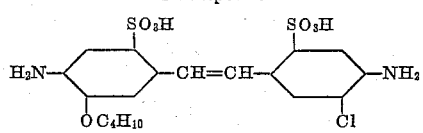

The procedure of Example 1 is followed using equivalent amounts of butanol and sodium butoxide. The product is then reduced by the procedure of Example 2.

Example 5

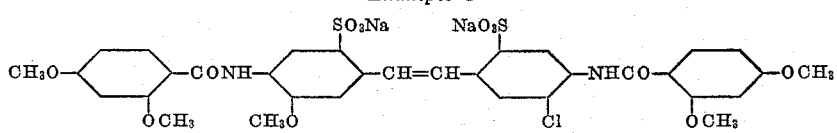

To 60 parts of pyridine is added 2.64 parts of redistilled thionyl chloride and then 3.64 parts of 2,4-dimethoxybenzoic acid. To this mixture is added 2.7 parts of the product of Example 2. The reaction mixture is heated at reflux until a sample gives a negative test for free amine when diazotized and spotted versus R-salt solution.

After addition of 6 parts of sodium carbonate in 50 parts of water, the pyridine is distilled off with steam. To the remaining solution, 15 parts of salt is added and the reaction mixture cooled. The product, disodium-4,4' - bis - (2,4 - dimethoxybenzamido) - 5 - methoxy-5'-chlorostilbene-2,2'-disulfonate, is isolated by filtration and dried. The product obtained is soluble in water and imparts to cotton a strong greenish blue fluorescence.

Similar products are obtained by starting with the products of Examples 3 and 4 and following the above procedure.

Example 6

A stock solution of brightener is made by dissolving 100 mg. of brightener in 5 liters of distilled water. Also, a stock soap solution is prepared by dissolving 10 g. of soap powder in 2 liters of distilled water.

Three one pint laundry jars are used for the test. To the first is added 7.2 cc. of stock brightener solution, to the second is added 8.1 cc., and to the last 9.0 cc. of stock brightener is added. Then to each jar, 100 cc. of stock soap solution is added. Then distilled water is added until the total volume is 150 cc. To each jar is added a 5 g. piece of 80 x 80 cotton. The jars are then closed and placed in a Laundrometer at 130° F. for 25 minutes. At the end of this time the jars are opened and the fabrics rinsed three times in cold water and then dried. The dyed fabric from each jar is then viewed under ultra violet light. It is found to appear quite white when compared with untreated cloth.

Example 7

When the intermediate of Example 2 is converted to a brightener by the method of Example 5 and dye tested by the method of Example 6, the cotton cloth fluoresces a greener shade of blue than cloth similarly dye tested using the brightener of the same structure except for presence of chlorine in place of the methoyl group in the 5 position.

We claim:

1. Compounds which in their free acid form have the structure:

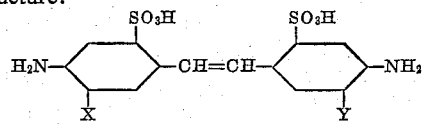

in which X is chlorine and Y is lower alkoxy.

2. 5 - methoxy - 5' - chloro - 4,4' - diaminostilbene-2,2'-disulfonic acid.

3. 5 - ethoxy - 5' - chloro - 4,4' - diaminostilbene-2,2'-disulfonic acid.

4. 5 - butoxy - 5' - chloro - 4,4' - diaminostilbene-2,2'-disulfonic acid.

No references cited.